Oct. 26, 1937.  H. C. HOWSAM  2,096,965
SPOOL
Filed Nov. 30, 1936
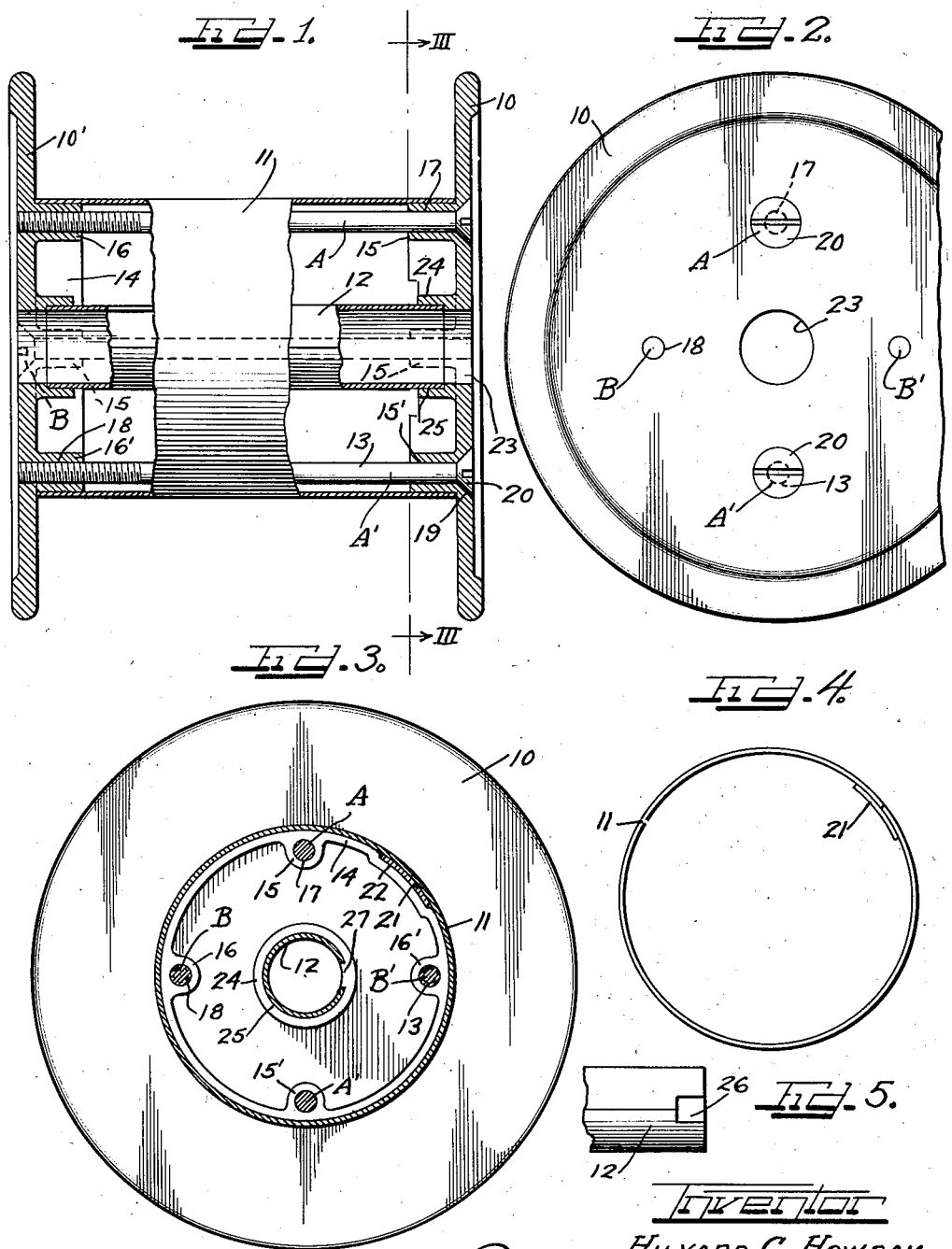
Inventor
HILYARD C. HOWSAM.
by Charles O'Fiell Attys.

Patented Oct. 26, 1937

2,096,965

UNITED STATES PATENT OFFICE 2,096,965

SPOOL

Hilyard C. Howsam, Chicago, Ill., assignor to Hubbard Spool Company, Chicago, Ill., a corporation of Illinois Application November 30, 1936, Serial No. 113,315

7 Claims. (Cl. 242—124)

My invention relates to spools for supporting material such as wire or the like, and which are strong and durable yet comparatively light, and which may be constructed entirely or only partly of metal.

An important object of the invention is to produce a spool whose head structures may be integral members, either metallic or non-metallic, and may be die cast or pressed, or molded, or otherwise formed, and whose barrel is made of sheet metal, or of suitable non-metallic material such as "Bakelite", fiber, or composition material, with the heads providing adequate seating surface for the barrel at its ends, and the provision of screws extending the full length of the spool inside the barrel for rigidly and securely clamping the heads to the barrel.

A further object is to provide an arrangement in which a number of screws may be extended through a number of equally spaced holes through one of the heads for threaded engagement with threaded aligned holes in the other head, and another set of screws may be extended through holes in said other head for threaded engagement with aligned threaded holes in the first mentioned head, this arrangement permitting the heads to be made exactly alike and interchangeable.

The above enumerated and other features of the invention are incorporated in the structure shown on the drawing, in which drawing—

Figure 1 is a side elevation, partly in vertical diametrical section;

Figure 2 is an end view;

Figure 3 is a section on plane III—III of Figure 1;

Figure 4 is an end view of the barrel; and

Figure 5 is a side elevation of an end of the arbor tube to show keyways.

The spool comprises heads 10 and 10', a barrel 11, an arbor receiving tube 12, and screws 13. The heads are preferably die castings of strong and durable yet comparatively light metal but could be die cast or pressed or molded or otherwise formed of non-metallic material, and each head has an annular inwardly extending flange 14, the flanges forming seats for snugly receiving the ends of the barrel. On its under side the flange 14 is enlarged at diametrically opposite sides to provide lugs 15 and 15', and lugs 16 and 16' diametrically opposite but spaced 90° from the lugs 15 and 15'. The lugs 15 and 15' have unthreaded passages 17 therethrough for passage of the screws 13, while the lugs 16 and 16' have threaded passages 18 therethrough for receiving the threaded ends of screws. At their outer ends the passages 17 are counterbored as indicated at 19 to receive the heads 20 of the screws. The barrel 11 may be a length of tubing of metal, or of suitable non-metallic material such as paper, "Bakelite", fiber, or other suitable non-metallic material. The barrel intimately receives the flanges 14 of the heads, and the heads are intimately clamped against the ends thereof by the tension of the screws. The screws 10 A and A' extending through the passages 17 in the head 10 have threaded engagements at their ends in the threaded passages 18 of the head 10', and the screws B and B' extending through the passages 17 in the head 10' have threaded engagements at their ends in the threaded passages 18 in the head 10. With this arrangement the heads can be made exactly alike in order to be interchangeable. I have shown four screws, but it is evident that a greater number of screws may be provided as desired, with one set of screws threading into one of the heads and the other set of screws threading into the other head.

Where the barrel is of sheet metal, it may be rolled into form from a rectangular piece of sheet metal and a tie plate or strip 21 of sheet metal is welded thereto for securing the ends of the barrel plate in abutting engagement. To accommodate the ends of the strip 21 so as to permit accurate seating of the barrel on the flanges 14, these flanges are provided with recesses 22 for receiving the ends of the strip 21, and the engagement of the strip ends in the recesses will prevent relative rotary displacement of the heads and the barrel.

Each head has a central bore 23 which continues through the annular flange 24 forming part of the head, the flange having the annular internal recess 25, these recesses receiving the ends of the arbor receiving tube 12. When the heads are clamped to the barrel by tensioning of the screws, the arbor tube 12 will be securely held in the recesses 25. At its ends, the tube 12 may be cut to provide keyways 26, and the flanges 24 may be formed to provide tongues or key portions 27 to be received by the keyways 26 when the spool is assembled, such engagement or interlock of the tube ends with the head structures assisting in strengthening the spool against relative rotational displacement of the head structures.

I thus provide a simple, durable spool which can be economically manufactured and assembled and which can be readily repaired. A broken or damaged head may be readily removed, and a new head applied, as the screws may be easily withdrawn for this purpose. The spool is highly resistant to longitudinal strains, as well as torsional strains.

Although I have shown a practical and efficient embodiment of the features of my invention, and I do not desire to be limited to the exact structure and arrangement shown and described, nor to the material used, as changes and modifications may be made without departing from the scope of the invention.

I claim as follows:

1. A spool structure of the class described comprising heads having annular flanges extending inwardly therefrom, a tubular barrel extending between said heads and seated at its ends on said flanges, and screws extending through and between said heads for clamping said heads to the barrel, each head having unthreaded openings and threaded openings with the unthreaded openings receiving the head ends of the screws and the threaded openings receiving the threaded ends of the screws.

2. A spool structure of the class described comprising heads having annular flanges extending inwardly therefrom, a tubular barrel extending between said heads and seated at its ends on said flanges, each head having screw receiving openings inwardly of but adjacent to the barrel, alternate screw holes being threaded, the threaded holes in one head being in alignment with the unthreaded holes in the other head, and screws extending through the unthreaded holes of one head for threaded engagement with the threaded holes in the other head, said screws serving to rigidly clamp said heads to the barrel.

3. A spool structure of the class described comprising heads having annular flanges extending inwardly therefrom, a tubular barrel extending between said heads and seated at its ends on said flanges, each head having two unthreaded screw holes inwardly of the barrel and diametrically opposite and two threaded screw holes inwardly of the barrel and diametrically opposite but displaced 90° from the unthreaded holes, the unthreaded holes in one head being in alignment with the threaded holes in the other head, and screws extending through the unthreaded holes of each head and threading at their ends in the threaded holes of the opposite head, said screws rigidly clamping said heads to the barrel.

4. A spool structure of the class described comprising heads having annular flanges extending inwardly therefrom, a tubular barrel extending between said heads and seated at its ends on said flanges, lugs on said heads inwardly of said flanges, said lugs being circumferentially uniformly spaced apart, said lugs having bolt passageways therethrough and the passageways in alternate lugs being threaded, the unthreaded lug passageways of one head being in alignment with the threaded lug passageways of the other head, and screws extending through the unthreaded lug passages of one head for threading engagement with the threaded lug passageways of the other head whereby said heads are rigidly clamped to said barrel.

5. A spool structure of the class described comprising heads having annular flanges extending inwardly therefrom, a tubular barrel extending between said heads and seated at its ends on said flanges, lugs on said heads inwardly of said flanges, said lugs being circumferentially uniformly spaced apart, said lugs having bolt passageways therethrough and the passageways in alternate lugs being threaded, the unthreaded lug passageways of one head being in alignment with the threaded lug passageways of the other head, and screws extending through the unthreaded lug passages of one head for threading engagement with the threaded lug passageways of the other head, whereby said heads are rigidly clamped to said barrel, each head having a central arbor receiving passageway surrounded by an internal annular flange on the head, said flanges having internal annular recesses at their inner ends, and an arbor receiving tube between the heads engaging at its ends in said flange recesses.

6. A spool structure of the class described comprising heads, a tubular barrel extending between said heads coaxial therewith, and screws extending between said heads for clamping said heads to the barrel, each head having unthreaded openings and threaded openings with the unthreaded openings receiving the head ends of the screws and the threaded openings receiving the threaded ends of the screws.

7. A spool structure of the class described comprising heads, a tubular barrel extending between said head coaxial therewith, each head having screw receiving openings inwardly of but adjacent to the barrel, alternate screw holes being threaded, the threaded holes in one head being in alignment with the unthreaded holes in the other head, and screws extending through the unthreaded holes of one head for threaded engagement with the threaded holes in the other head, said screws serving to rigidly clamp said heads to the barrel.

HILYARD C. HOWSAM.